United States Patent [19]
Gebald et al.

[11] Patent Number: 5,115,631
[45] Date of Patent: May 26, 1992

[54] SLIVER CAN TRANSPORT APPARATUS

[75] Inventors: Gregor Gebald, Leppershutte 49, Monchengladbach 2; Manfred Langen, Schulstrasse 58, Monchengladbach 1; Helmut Bungter, Viersen, all of Fed. Rep. of Germany

[73] Assignees: Gregor Gebald; Manfred Langen, both of Monchengladbach, Fed. Rep. of Germany

[21] Appl. No.: 591,942

[22] Filed: Oct. 2, 1990

[30] Foreign Application Priority Data

Oct. 19, 1989 [DE] Fed. Rep. of Germany ....... 3934816

[51] Int. Cl.⁵ .................... D01H 9/10; B65G 25/00
[52] U.S. Cl. ........................................ 57/281; 198/742
[58] Field of Search ................ 57/281; 19/159 A; 198/742

[56] References Cited

U.S. PATENT DOCUMENTS

| | | | |
|---|---|---|---|
| 3,125,782 | 3/1964 | Kaino et al. | 19/159 A |
| 3,214,799 | 11/1965 | Gossett et al. | 19/159 A |
| 4,042,093 | 8/1977 | Fujii et al. | 19/159 A X |
| 4,089,203 | 5/1978 | Wallis | 198/742 X |
| 4,172,517 | 10/1979 | Kobayasi | 198/742 X |
| 4,469,214 | 9/1984 | Maurer et al. | 57/281 X |
| 4,477,945 | 10/1984 | Vignon et al. | 19/159 A X |
| 4,537,018 | 8/1985 | Tooka | 57/281 X |
| 4,749,079 | 6/1988 | Minto | 198/742 |

FOREIGN PATENT DOCUMENTS

| | | |
|---|---|---|
| 1265014 | 3/1968 | Fed. Rep. of Germany . |
| 1964857 | 7/1971 | Fed. Rep. of Germany . |
| 3809282A1 | 9/1989 | Fed. Rep. of Germany . |

*Primary Examiner*—Daniel P. Stodola
*Assistant Examiner*—John F. Rollins
*Attorney, Agent, or Firm*—Shefte, Pinckney & Sawyer

[57] ABSTRACT

An apparatus for transporting sliver cans between a sliver can handling location and a textile spinning machine includes a rod member having a plurality of uniformly spaced engaging members. A pair of preferably plastic, parallel sliding rails each extend parallel to the rod member on a respective side thereof for supporting the sliver cans for sliding movement therealong. The rod member is supported for axial and rotational movement and is operatively connected to a drive device which cyclically axially displaces the rod member by a uniform amount of travel corresponding to a uniform spacing between the sliver cans. The rod member is rotated 90° to move the engaging members between horizontal disengage positions in which they are out of engagement with the sliver cans and vertical engage positions in which the engaging members project vertically for engaging the bottom rim portions of the sliver cans during axial displacement of the rod member. In one modification, the rod member is supported by a plurality of slide blocks each associated with a respective one of the engaging members and having a radial slot for permitting movement of the associated engaging member between its engage and disengage positions.

6 Claims, 3 Drawing Sheets

SLIVER CAN TRANSPORT APPARATUS

BACKGROUND OF THE INVENTION

The present invention relates to a sliver can transport apparatus and, more particularly, to a sliver can transport apparatus for transporting sliver cans between a sliver can handling location and a textile spinning machine at which a plurality of spinning stations are each adapted for receiving a supply of sliver delivered from a respective sliver can.

German Patent Document DE-AS 12 65 014 discloses a sliver can transport apparatus having belts for effecting movement of the sliver cans. German Patent Document DE-OS 38 09 282 discloses a sliver can transport apparatus having rollers for rolling transport of the sliver cans therealong. German Patent Document DE-AS 19 64 857 discloses a sliver can transport apparatus having an endless member for moving sliver cans along sliding support members.

In such known sliver can transport apparatuses, small pieces of sliver and other debris accumulate at a relatively high frequency on the moving parts of the sliver can transport apparatuses, thus necessitating relatively frequent cleanings thereof. The cleaning of the moving parts is further complicated by the fact that the rollers, belts and endless members are frequently disposed below floor level, thereby complicating access to the moving parts. Moreover, the below floor level dispositions of some of the components of the sliver can transport apparatuses increases the risk of injury since objects such as a person's foot can be caught therein.

German Patent Document DE-OS 31 33 438 discloses a sliver can transport apparatus having an axially displaceable shaft with a number of pivotable sliver can engaging members disposed at axial spacings therealong. Each pivotable engaging member is biased by a spring into a non-parallel disposition with respect to the shaft. The shaft is axially displaceable to position the sliver can engaging members for engaging the sliver cans at locations on the trailing portions of the cans relative to the direction of advancement to effect advancement of the sliver cans during axial displacement of the shaft. The sliver can engaging members pivot against the bias of their respective springs as they are moved in sliding contact with the sliver cans during axial displacement of the shaft in an opposite return direction. However, the need exists for a sliver can transport apparatus which advantageously simplifies the construction for transporting the sliver cans and which, moreover, reduces the risk of injury.

SUMMARY OF THE INVENTION

The present invention provides a sliver can transport apparatus of an advantageously simplified construction comprising an axially displaceable rod member and a plurality of sliver can engaging members.

Briefly described, the present invention provides an apparatus for transporting sliver cans between a sliver can handling location and a textile spinning machine at which a plurality of spinning stations are each adapted for receiving a supply of sliver delivered from a respective sliver can. The apparatus includes sliver can support means for supporting sliver cans during movement of the sliver cans along a transport path extending between the sliver can handling location and the textile spinning machine and a plurality of engaging members each for individually engaging at least one sliver can.

Additionally, the apparatus includes positioning means for supporting the engaging members thereon, the positioning means being operable to commonly move the engaging members between engage positions in which the engaging members are positioned for engagement with the sliver cans for advancing movement of the sliver cans in correspondence with displacement of the positioning means and disengage positions in which the engaging members are out of engagement with the sliver cans for movement of the engaging members relative to the sliver cans. The apparatus also includes drive means, operatively connected to the positioning means, for displacing the positioning means in a drive direction with the engaging members in the engage positions to effect advancing movement of the engaged sliver cans along the transport path and for displacing the positioning means in a return direction with the engaging members in the disengage positions out of sliver can engagement to a position to dispose the engaging members for subsequent movement thereof from the disengage positions to the engage positions for engagement and advancement of respective following sliver cans upon subsequent movement of the positioning means in the drive direction.

According to one aspect of the present invention, the drive means displaces the positioning means in a return direction generally opposite to the drive direction. In a further aspect of the present invention, the positioning means includes an elongated rod member having an axis and means for supporting the rod member for axial displacement and for rotation about its axis. The engaging members are preferably secured to the rod member at generally uniform spacings therealong and extend generally radially from the rod member relative to the rod member axis. The rod member is rotatable about its axis to move the engaging members between the engaged and disengaged positions and the drive means being operable to axially displace the rod member in one direction with the engaging members in the engage positions to effect advancing movement of the sliver cans and to axially displace the rod member in the return direction with the engaging members in the disengage positions to dispose the engaging member for subsequent movement into the engage positions.

In one feature of the further aspect of the present invention the engaging members project radially from the rod member with all of the engaging members being in generally the same radial plane relative to the rod member axis. In other features of the further aspect of the present invention the rod member supporting means includes a plurality of slide blocks, each slide block being secured to the rod member at a fixed axial position relative thereto for axial movement therewith and permitting rotation of the rod member relative thereto, and slide block guide means for guiding the slide blocks during axial movement of the rod member and slide blocks by the drive means.

According to yet another feature of the further aspect of the present invention, each slide block is secured to the rod member generally at the axial location thereon of a respective one of the engaging members and each slide block includes a slot extending radially with respect to the rod member axis for receiving the respective associated engaging member therein, the slot permitting movement of the respective associated engaging member between its engage and disengage positions.

Each slide block preferably includes a top surface having an inclined portion, the slot being formed in the top surface and the angle between each engaging member in its engage position and the inclined top surface portion of the associated slide block is greater than 90°.

In conjunction with a textile spinning machine in which each sliver can includes a circumferential rim portion of a predetermined thickness as measured in a radial direction thereof, the apparatus of the present invention provides sliver can supporting means for supporting the sliver cans thereon with each adjacent pair of sliver cans at a uniform center to center spacing from one another and the drive means preferably includes means for cyclically axially displacing the rod member in the drive and return directions by an amount of travel no less than the uniform engaging member spacing.

According to an additional aspect of the present invention, the uniform center to center spacing between each adjacent pair of sliver cans is a multiple of the uniform engaging member spacing.

According to yet a further aspect of the present invention, the sliver can supporting means includes a pair of planar support surfaces on which the sliver cans are supported. The planar support surfaces are spaced from one another in a direction transverse to the can transport path, and a longitudinal slot extends between the planar support surfaces parallel to the can transport axis and has an extent transverse to its longitudinal extent for permitting movement of the engaging members between the engage position in which the engaging members project beyond the planar support surfaces for engaging the sliver cans and the disengage positions in which the engaging members are disposed below the planar support surfaces.

In a further additional aspect of the present invention, the drive means includes a rotatable disk member and a drive rod pivotally connected at one end to the rotatable disk and at its other end to one end of the rod member, the disk member being rotatable to cyclically axially displace the rod member.

The sliver can transport apparatus of the present invention therefore reliably advances the sliver cans from the sliver can handling location to the textile spinning machine without any detrimental relative frictional movement between the apparatus and the sliver cans advanced thereby. Moreover, the capability of the sliver can transport apparatus to individually engage each sliver can allows sufficient driving force to be applied to each sliver can to effect advancing movement thereof without the need for supplementary movement facilitating devices such as, for example, roller wheels along which the sliver cans roll. Additionally, the relatively minimal vertical dimension of the housing of the sliver can transport apparatus minimizes the below-the-floor construction requirements for installing the sliver can transport apparatus. This minimal vertical dimension, which is in the range of approximately 25 to 35 millimeters, reduces the risk of injury to an operator or other person.

A further advantage of the sliver can transport apparatus of the present invention resides in the fact that the sliver cans are supported on spaced, parallel sliding movement rails throughout their advancing movement. Thus, unevenness or other irregularities in the floor surface in which the sliding movement rails are mounted will not adversely affect the advancing movement of the sliver cans since the sliver cans are supported only on the sliding movement rails.

DETAILED DESCRIPTION OF THE PREFERRED EMBODIMENT

Figure 1:
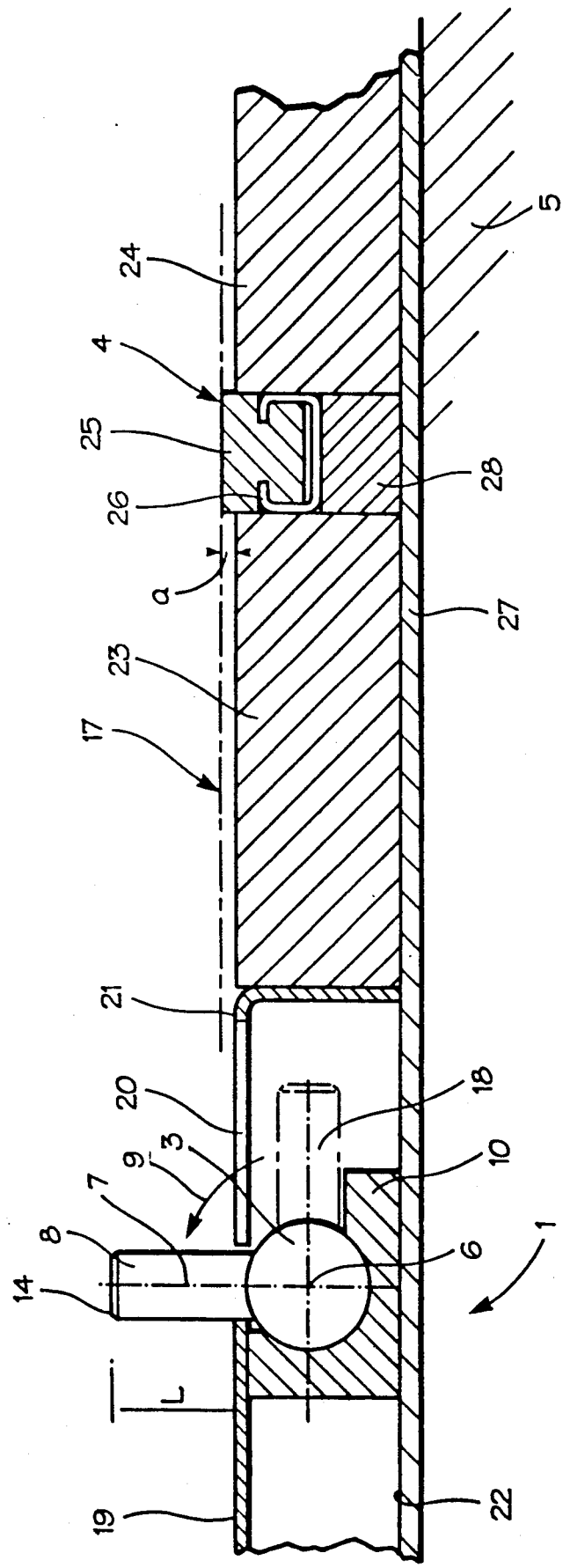
FIG. 1 is a vertical transverse sectional view of a portion of the preferred embodiment of the sliver can transport apparatus of the present invention.
Figure 2:
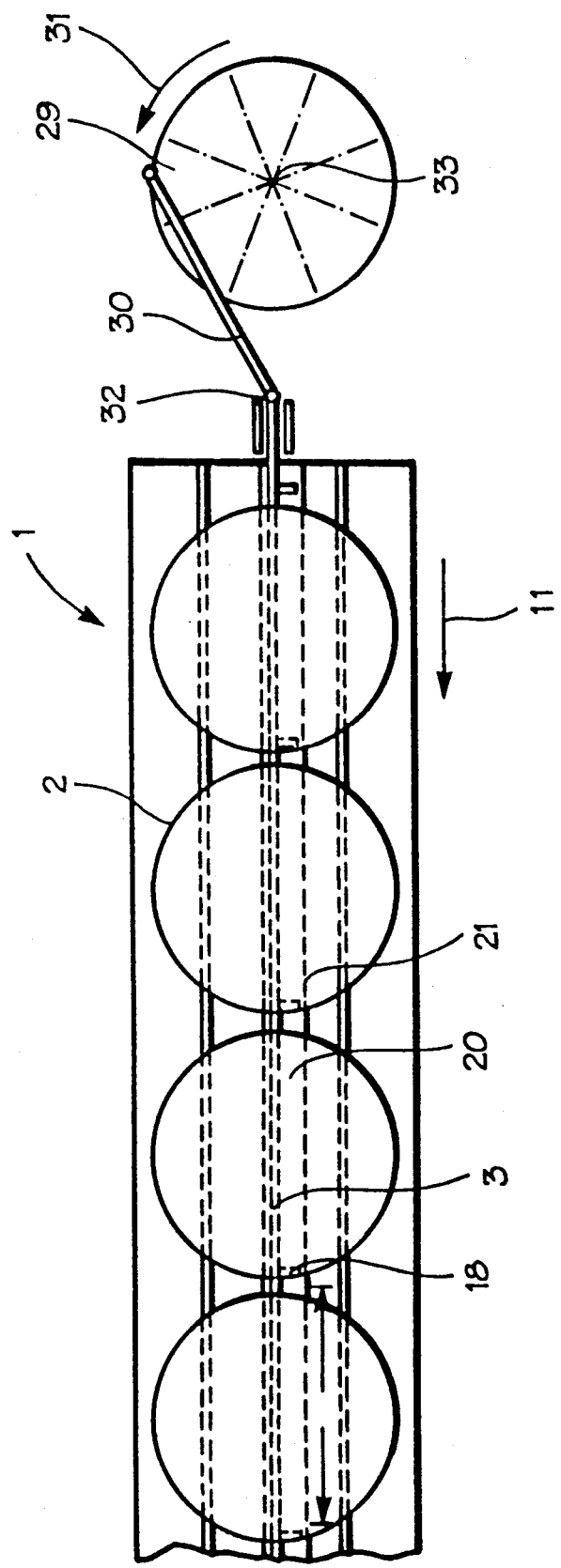
FIG. 2 is a plan view of the preferred embodiment of the sliver can transport apparatus of the present invention and showing a plurality of sliver cans arranged for transport by the sliver can transport apparatus.
Figure 3:
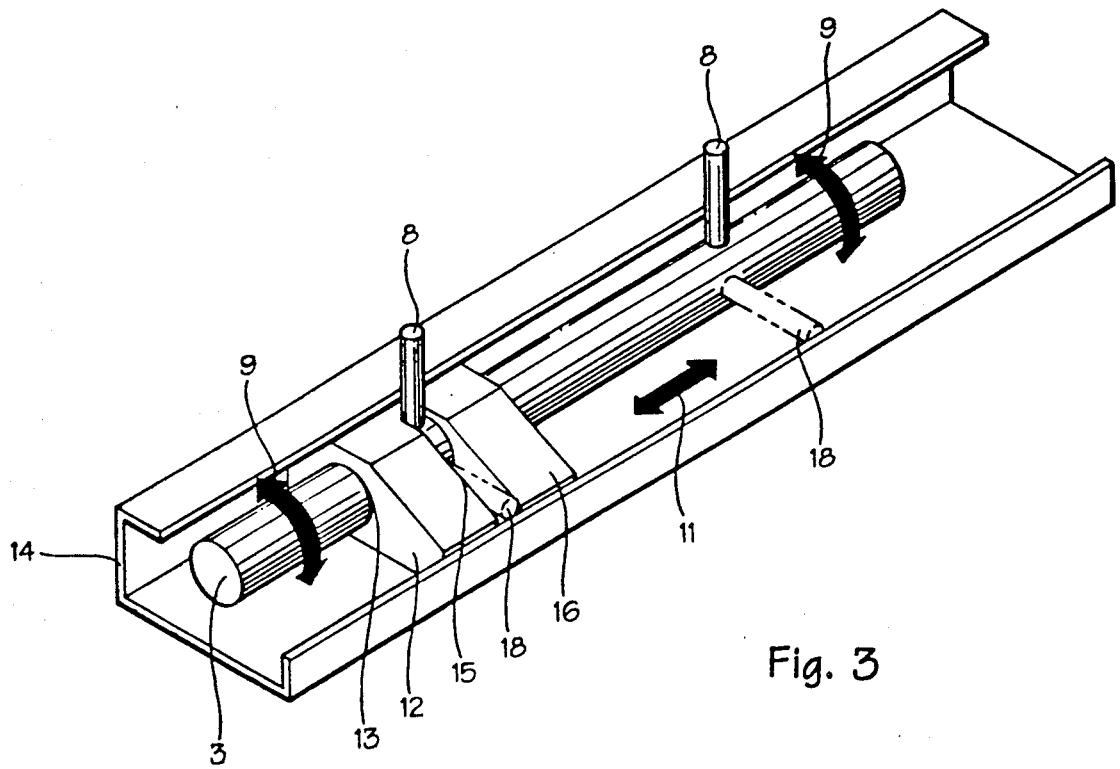
FIG. 3 is a perspective view of a modification of the preferred embodiment of the sliver can transport apparatus shown in FIGS. 1 and 2.

As seen in FIGS. 1-3, the preferred embodiment of the sliver can transport apparatus 1 of the present invention is operable to transport a plurality of sliver cans 2 between a sliver can handling location (not shown) such as, for example, a sliver can filling station, and a textile spinning machine (not shown) having a plurality of spinning stations each adapted for receiving a supply of sliver delivered from a respective one of the sliver cans 2. Each sliver can 2 is cylindrical and includes an annular bottom rim portion which extends downwardly beyond the cylindrical bottom of the sliver can itself. The sliver can transport apparatus 1 includes a sliver can support means including a pair of planar support surfaces in the form of a pair of spaced, parallel sliding rails 4 extending between the sliver can handling location and the textile spinning machine for supporting the sliver cans 2 at a spacing above a floor 5 during their transport. As seen in FIG. 2, the spaced, parallel sliding movement rails 4 are sufficiently spaced from one another relative to the diameter of a sliver can 2 for stably supporting the sliver cans 2 during movement of the sliver cans along their transport between the sliver can handling location and the textile spinning machine.

The sliver can transport apparatus 1 also includes a positioning means having a rod member in the form of a cylindrical rod 3 rotatably supported by a rod support member 10, shown in FIG. 1, for rotation about its axis 6. The rod support member 10, which is preferably formed of plastic material, is mounted in a housing 22 and extends parallel to the sliding movement rails 4 at a generally equal spacing from each sliding movement rail. The housing 22 includes a planar bottom member 27 which is mounted on the floor 5. As seen in FIG. 1, each sliding movement rail 4 is formed of a molded plastic component 25 having a planar top surface for sliding movement therealong of the sliver cans 2 and having longitudinally extending grooves on opposed longitudinal sides thereof for receiving therein the free ends of a generally C-shaped steel bracket 26. The steel bracket 26 is mounted by conventional securement means such as, for example, by bolts, to a support block 28 which is mounted to a bottom member 27 of the housing 22. The molded plastic component 25 is not fixedly secured to the C-shaped steel bracket 26 but is, instead, movably secured to the steel bracket through the receipt of the free ends of the steel bracket in the grooves of the molded plastic component. This arrangement permits thermal expansion of the sliding movement rail 4 relative to its axial extent due to, for example, heating of the molded plastic component 25 by the sliding movement of the sliver cans 2 therealong. The planar top surface of the molded plastic component 25 supports the sliver cans 2 for sliding movement in a slide plane 17, as seen in FIG. 1.

As seen in FIG. 1, the housing 22 includes a plate 19 which extends parallel to the bottom surface 27 of the housing 22 at a spacing thereabove. The plate 19 has a longitudinal edge extending parallel to the sliding movement rails 4. A flange 21 mounted to the housing 22 includes a longitudinal edge extending parallel to the longitudinal edge of the plate 19 at a spacing therefrom 0 transverse to the sliding movement rods 4. The longitudinal edges of the plate 19 and the flange 21 define a longitudinally extending slot 20 therebetween.

As seen in FIG. 1, a pair of spacing blocks 23, only one of which is shown, are preferably formed of wood, and are mounted on the bottom member 27 of the housing 22. Each spacing block 23 extends into abutment with the flange 21 on one side and into abutment on an opposite side with one side of the molded plastic component 25, the steel bracket 26 and the support block 28 of a respective one of the sliding movement rails 4. A pair of second spacing blocks 24, only one of which is shown in FIG. 1, are preferably formed of wood and are mounted to the bottom member 27 of the housing 22. Each second spacing block 24 extends into abutment with an opposite side of the molded plastic component 25, the steel bracket 26 and the support block 28 of a respective sliding movement rail 4. The spacing blocks 23,24 provide support to the sliding movement rails 4. The top surfaces of the spacing blocks 23,24, the flange 21 and the plate 19 lie generally in a common plane at a spacing A below the slide plane 17 along which the sliver cans 2 slide on the sliding movement rails 4.

A plurality of sliver can engaging members 8, which are preferably in the form of steel pins having a diameter approximately in the range of 8 millimeters, are fixedly secured by conventional securement means such as, for example, by weldments, to the cylindrical rod 3 at uniform axial spacings A therealong, as seen in FIG. 2. The sliver can engaging members 8 are secured to the cylindrical rod 3 such that their axes 7 intersect the axes 6 of the cylindrical rod 3 and are co-planar with one another.

The engaging members 8 are adapted for individually engaging at least one of the sliver cans 2 to effect advancement of the sliver cans 2 in an advancing direction 11, as seen in FIG. 2. The cylindrical rod 3 is operatively connected to a rotation drive means for commonly moving the engaging members 8 between engage positions in which the engaging members are positioned for engagement with the sliver cans 2 for advancing movement of the sliver cans in correspondence with axial displacement of the cylindrical rod 3 and disengage positions in which the engaging members are out of engagement with the sliver cans 2 for movement of the engaging members relative to the sliver cans. The engaging members extend vertically above the slide plane 17 in their engage positions, shown by the solid line position of the engaging member 8 in FIG. 1, and are movable via rotation of the cylindrical rod 6 through an angular displacement path 9 through the longitudinal slot 20 to their disengage positions, representatively shown by the broken line position 18 in FIG. 1. The axial extent L of the engaging members 8, as measured along a radius of the cylindrical rod 3, is selected such that the engaging members 8 extend sufficiently above the slide plane 17 in the engage position of the engaging members for contacting the inner circumferential surfaces of the sliver cans 2. The engaging members 8 are disposed vertically below the sliding plane 17 at a clearance from the sliver cans 2 supported thereabove in their disengage positions.

The spacing between the tops of the engaging members 8 in their disengage positions, as shown by the broken line position 18 in FIG. 1, and the edge 21, as measured in a radial direction with respect to the axis 6 of the cylindrical rod 3, is preferably sufficiently great to prevent pinching or compression of an object such as, for example, a person's foot, which may be caught therebetween.

The cylindrical rod 3 is operatively connected to a drive means for axially displacing the cylindrical rod 3 with the engaging members 8 in their engage positions in a drive direction to effect advancing movement of the engaged sliver cans 2 in the advancing direction 11 and for axially displacing the cylindrical rod 3 in a return direction generally opposite to the advancing direction 11 with the engaging members 8 in their disengage positions to dispose the engaging members for subsequent movement into their engage positions. The drive means includes a disk member 29 operatively connected to a conventional drive motor (not shown) for driving rotation of the disk member 29 about an axis 33 in a direction of rotation 31, as seen in FIG. 2. The diameter of the disk member 29 is equivalent to the spacing A between the engaging members 8 or a multiple thereof. A drive rod 30 is pivotally secured at one end by a drive rod pivot connection to the circumference of the disk member 29 and is pivotally secured at its other end via a universal-type joint 32 to one end of the cylindrical rod 3. The vertical axis 33 of the disk member 29 is transverse to and intersects the horizontal axis 6 of the cylindrical rod 3 beyond the extent of the rod 3.

Due to this arrangement of the axis 33 of the disk member 29 and the axis 6 of the cylindrical rod 3, the axis 6 intersects the travel path of the drive rod pivot connection at two diametrically opposed locations relative to the circumference of the disk member 29 and, as a result, the drive rod 30 is moved into two extreme positions in which it is parallel with the axis 6 of the cylindrical rod 3 during each complete 360° revolution of the disk member 29.

Figure 4:
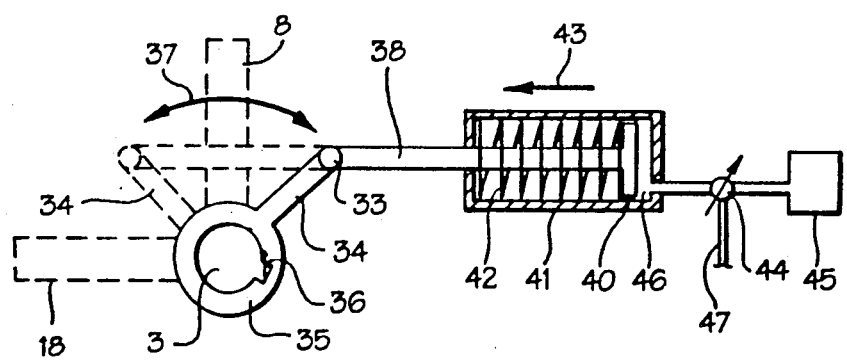
FIG. 4 is a vertical transverse sectional view of a portion of the preferred embodiment of the sliver can transport apparatus shown in FIG. 2.

The rotation drive means for commonly moving the engaging members 8 between their engage and disengage positions is illustrated in FIG. 4, which is a vertical transverse sectional view taken along a line extending transversely to the axis 6 of the cylindrical rod 3 at a location across the cylindrical rod 3 adjacent the joint 32. The rotation drive means includes a collar member 35 having an annular inner surface of a diameter slightly greater than the diameter of the cylindrical rod 3. The annular inner surface of the collar member 35 receives the cylindrical rod 3 therethrough and includes a key way extending parallel to the axis 6 of the cylindrical rod 3 for receiving a key or spline 36 therein. The key 36 is in the form of an axially extending projection formed on the cylindrical rod 3. The collar member 35 thus permits the cylindrical rod 3 to move relatively thereto during its axial movements with the key 36 moving relatively within the key way of the collar member 35. Upon rotation of the collar member 35 about its axis, its key way engages the key 36 to effect corresponding rotation of the cylindrical rod 3 about its axis 6.

A rotation drive arm 34 extends from the collar member 35 in a radial direction therefrom and is pivotally connected at its free end by a pivot connection 39 to the free end of a piston 38. The other end of the piston 38 includes a radially enlarged head portion 40. The piston 38 is movably supported in the cylinder 41 of a conventional pneumatic cylinder and piston assembly. The cylinder 41 is selectively communicable with a conventional pneumatic fluid source 45 via a valve 44. A pneumatic fluid relief conduit 47 is operatively connected to the valve 44 for the return of pneumatic fluid from the cylinder 41 to the pneumatic fluid source 45.

The cylinder 41 is mounted relatively adjacent the end of the cylindrical rod 3 which is pivotally connected by the universal-type joint 32 to the drive rod 30. The cylinder 41 supports the piston 38 for selective extension of the piston in a direction 43 transverse to the axis 6 of the cylindrical rod 3 and for retraction of the piston 38 in the opposite direction. A spring 42 disposed within the cylinder 41 biases the piston 38 in its retracted position.

The operation of the sliver can transport apparatus 1 shown in FIGS. 1 and 2 is as follows. The sliver cans 2 are loaded, in manual or automatic manner, onto the sliding movement rails 4 such that the axes of the sliver cans are generally in a vertical plane defined by the cylindrical rod and the cans are uniformly spaced from one another relative to the axis 6 of the cylindrical rod 3 by a spacing no greater than the spacing a between the engaging members 8. The sliver can spacing a is necessarily, at a minimum, equal to the outer diameter of a sliver can 2 or, in other words, equal to the inner diameter of a sliver can 2 plus twice the thickness of the bottom rim portion of the sliver can, as measured in a radial direction thereof. The engaging members 8 are initially disposed in their horizontal disengage positions. The disk member 29 is rotated in the rotational direction 31 through an angular displacement sufficient to dispose each engaging member 8 at a location relative to a respective one of the sliver cans 2 for engagement of the respective sliver can upon movement of the engaging member 8 from its disengage position to its vertical engage position. Specifically, the disk member 29 is rotated until the drive rod pivot connection is positioned at the respective travel path location intersected by the axis 6 which is most remote from the sliding movement rails 4 relative to the axis 6. In this position of the drive rod pivot connection, the drive rod 30 is aligned with the rod axis 6 and intersects the axis 33 of the disk member 29.

The cylindrical rod 3 is axially displaced in correspondence with the rotation of the disk member 29. During its axial movement, the cylindrical rod 3 moves relative to the collar member 35 with the key 36 moving relatively within the key way of the collar member.

In correspondence with the positioning of the drive rod pivot connection, the cylindrical rod 3 is then rotated approximately 90° about its axis 6 to commonly move the engaging members 8 from their horizontal disengage positions to their vertical engage positions, shown in solid lines in FIG. 1, in which each engaging member 8 projects vertically beyond the slide plane 17. To initially dispose the engaging members 8 in their horizontal disengage positions, pneumatic fluid is supplied from the pneumatic fluid source 45 to the cylinder 41 to effect extension of the piston 38 in the direction 43 shown in FIG. 4 against the bias of the spring 42. The extension movement of the piston 38 effects movement of the rotation drive rod 34 from the solid line position shown in FIG. 4 to the broken line position 34' through an arc indicated by the arrow 37.

To commonly move the engaging members 8 from their horizontal disengage positions to their vertical engage positions, shown in solid lines in FIG. 1, the valve 44 is operated to permit the return of pneumatic fluid from the cylinder 41 through the pneumatic fluid return conduit 47 to the pneumatic fluid source 45. The spring 42 acts on the head portion 40 of the piston 38 to retract the piston relative to the cylinder 41 in a direction opposite to the direction 43 shown in FIG. 4 and the pneumatic fluid is correspondingly expelled from the cylinder 41. The retraction of the piston 38 effects rotation of the collar member 35 about its axis as the rotation drive arm 34 moves from the broken line position 34' to the solid line position shown in FIG. 4. As the collar member 35 rotates, its key way engages the key 36 to effect corresponding rotation of the cylindrical rod 3 about its axis 6 and this corresponding rotation effects movement of the engaging members 8 from their horizontal disengage positions to their vertical engage positions. It should be noted that the engaging members 8 are positioned relatively closely adjacent the forwardmost portion of the inner circumferential surface of the bottom rim portions of the sliver cans 2 relative to the advancing direction 11 as the engaging members complete their movements from their disengage positions to their engage positions. FIG. 2 illustrates the positions of the engaging members 8 immediately before they are moved from their disengage to their engage positions.

In correspondence with the movement of the engaging members 8 into their engage positions, the disk member 29 is further rotated in the rotation direction 31 and this further rotation effects movement of the drive rod pivot connection from its remote travel path position and corresponding axial displacement of the cylindrical rod 3 in the advancing direction 11. As the cylindrical rod 3 is axially displaced, the engaging members 8 engage the inner circumferential surfaces of the bottom rim portions of the sliver cans 2; Since the sliver cans 2 are supported on the sliding movement rails 4 with their axes generally coplanar with the axis 6 of the cylindrical rod 3, the sliver cans 2 slide along the sliding movement rails 4 due to the pushing action of the engaging members 8 with substantially no angular movement of the sliver cans 2. Thus, the sliver cans 2 remain generally centered on the axis 6 of the cylindrical rod 3 and are generally maintained at the sliver can spacing a during their advancing movement from their sliver can handling location to the textile spinning machine.

After sliver can advancement, the disk member 29 has rotated through 180° thereby positioning the drive rod pivot connection at its travel path location on the axis 6 most closely adjacent the sliding movement rails 4 and, in correspondence therewith, the cylindrical rod 3 is then rotated through an angular movement of 90° to move the engaging members 8 from their vertical engage positions to their horizontal disengage positions. Specifically, pneumatic fluid is supplied to the cylinder 41 to effect extension of the piston 38 in the direction 33 shown in FIG. 4. The extension movement of the piston 38 effects corresponding rotation of the collar member 35 about its axis. The key way of the collar member 35 engages the key 36 to effect corresponding rotation of the cylindrical rod 3 about its axis 6 and corresponding movement of the engaging members 8 from their vertical engage positions to their horizontal disengage positions.

During the just completed cycle of advancing movement, each sliver can 2 has been pushed by a respective one of the engaging members 8 through a distance equal to or a distance that is a multiple of the spacing A between the engaging members 8. Following movement of the engaging members into their disengage positions, the disk member 29 is further rotated in the rotation direction 31 to effect movement of the rod 3 and engaging members 8 relative to the sliver cans 2 in the direction opposite to the advancing direction 11 without engagement with or movement of the sliver cans 2. At the completion of angular movement of the disk member 29 through 180°, the drive rod pivot connection is again disposed at the respective travel path location intersected by the axis 6, which is most remote from the sliding movement rails 4 relative to the axis 6. This movement positions each engaging member 8 at a location for subsequent movement into engagement with the sliver can following the sliver can which the respective engaging member 8 has just engaged. Alternatively, the disk member 29 can be halted with the drive rod pivot connection at its most closely adjacent travel path position.

The disk member 29 can be continuously operated to effect continuous advancement of the sliver cans 2 in the advancing direction or, alternatively, the disk member 29 can be intermittently operated in correspondence with the sliver can replacement requirements of the textile spinning machine.

The disk member 29 can be constructed of an appropriate diameter to effect cyclic axial displacement of the cylindrical rod 3 in which the engaging member 8 are moved in the advancing direction 11 by an amount of travel which is a multiple of the sliver can spacing A. For example, each engaging member 8 can be moved by an amount of travel equal to twice the spacing A and, correspondingly, each engaging member 8 would drive an adjacent pair of the sliver cans 2 during each cyclic advancing movement of the cylindrical rod 3.

Since the drive rod pivot connection begins its travel from one of its two diametrically opposed travel path locations on the axis 6, the drive rod 30 is positioned at a respective one of its extreme positions during the beginning of the movement of the cylindrical rod 3 in a respective axial direction. Thus, the cylindrical rod 3 is initially axially displaced at a relatively slow rate of movement as the drive rod 30 is driven out of its respective extreme position. Similarly, the rate of movement of the cylindrical rod 3 is relatively slower as it completes its axial movement due to the travel of the drive rod 30 into its other respective extreme position as the drive rod pivot connection travels into its other travel path location on the axis 6.

Accordingly, at the beginning of each axial movement of the cylindrical rod 3 in the drive direction with the engaging members 8 in their engaging positions, the engaging members 8 move relatively slowly as they come into contact with the inner circumferential surface of the bottom rim portions of the sliver cans 2, thereby avoiding detrimental de-stabilizing impacts with the sliver cans 2 which would otherwise occur if the rate of movement of the engaging members 8 into engagement with the sliver cans 2 were relatively high. Moreover, the relatively slow rate of movement of the engaging members 8 at the end of the advancing movement of the sliver cans 2 effects a corresponding decrease in the rate of movement of the sliver cans 2 relative to the sliding movement rails 4, thereby minimizing the risk that the momentum of the sliver cans 2 will continue to move the sliver cans in the advancing direction 11 after the engaging members 8 have completed their driving engagement with the sliver cans. The sliver cans 2 are thus relatively precisely positioned at the end of each advancing cyclic movement so that the next cyclic engagement of the sliver cans by the engaging members 8 can be reliably accomplished.

In FIG. 3, a modification of the embodiment of the sliver can transporting apparatus 1 of the present invention is illustrated and is identical to the embodiment of the sliver can transport apparatus 1 illustrated in FIGS. 1 and 2 except that the housing 22 and the rod support member 10 have been deleted. In lieu of the housing 22, a generally L-shaped housing 14 is provided and, in lieu of the rod support member 10, a plurality of slide blocks 12, only one of which is illustrated, are provided.

Each slide block 12 includes an annular throughbore 13 of a diameter slightly greater than the cylindrical rod 3 for receiving the cylindrical rod therethrough so that the slide blocks 12 support the cylindrical rod 3 for free rotation about its axis 6 in the rotation direction 9. Each slide block 12 includes a slot 15 extending radially with respect to the axis 6 of the cylindrical rod 3 dimensioned for receiving a respective one of the engaging members 8 therein to permit the engaging member 8 to freely move between its engage and disengage positions through rotation of the cylindrical rod 3.

Each slide block 12 includes a top surface having a horizontal portion which forms the portion of the slot 15 of the slide block in which the engaging member 8 is received when it is in its upright engage position and an inclined surface 16 which forms the balance of the slot 15. The inclined surface 16 extends upwardly from generally the vertical level of the respective engaging member 8 in its horizontal disengage position on one side of the slide block 12 to the horizontal top surface portion and is at an angle greater than 90° with the respective engaging member 8 when it is in its engage position. The inclined surface 16 minimizes the risk that an object such as, for example, a person's finger, will be injured due to the movement of the engaging members 8 from their upright engage positions to their disengage positions. In the event an object were to be caught between the downwardly pivoting engaging member 8 and the slide block 12, the inclined surface 16 urges the caught object outwardly away from the slide block 12.

The slide blocks 12 are movably retained by the support member 14 for sliding movement of the blocks in a direction parallel to the axis 6 of the cylindrical rod 3. An upper flange of the support member 14 extends over a portion of the top surface of each slide block 12 and the support member 14 includes a pair of parallel side wall portions spaced from one another at a spacing slightly greater than the transverse extent of the slide blocks 12 for preventing transverse movement of the slide blocks 12. The upper flange and the bottom portion of the support member 14 prevent vertical movement of the slide blocks 12.

During axial displacement of the cylindrical rod 3, the slide blocks 12 are engaged by their respective associated engaging members 8 and slide within the support member 14 in correspondence with the cylindrical rod axial displacement. The cylindrical rod 3 is freely rotatable with respect to the slide blocks 12 to move the engaging members 8 from their upright engage positions to their disengage positions in which they are generally horizontally received in the slots 15 of the slide blocks 12.

In one variation of the modification shown in FIG. 3, the slide blocks 12 are replaced by non-axially movable support members such as, for example, the support member 10 illustrated with respect to the embodiment in Figures 1 and 2. In this variation, the engaging members 8 are fixedly secured to the cylindrical rod 3 in a common radial plane with respect thereto and the support member for supporting the cylindrical rod 3 for axial rotation movement is disposed within the support member 14. This modification is illustrated by the engaging member 8 shown in the upper portion of FIG. 3.

Although the various embodiments of the sliver can transport apparatus of the present invention have been discussed with respect to the transport of sliver cans, the present invention contemplates that other transportable objects such as, for example, plates, boxes, peg-tray textile package support members and the like can also be readily transported by an apparatus constructed in accordance with the principles of the present invention and it should be understood that, for the purposes of this invention, plates, boxes, peg-tray textile package support members and the like are the equivalent of sliver cans.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. Apparatus for transporting sliver cans between a sliver can handling location and a textile spinning machine at which a plurality of spinning stations are each adapted for receiving a supply of sliver delivered from a respective sliver can, comprising:

sliver can supporting means for supporting sliver cans during movement of the sliver cans along at least a portion of a transport path extending between the sliver can handling location and the textile spinning machine, said sliver can support means including a pair of generally planar support surfaces on which the sliver cans are supported for movement in a plane, said planar support surfaces being spaced from one another in a direction transverse to the transport path, and a longitudinal slot extending between said planar support surfaces parallel to the transport path, said sliver can support means supporting each sliver can thereon in a supported disposition in which the sliver can is supported by both of said planar support surfaces and extends therebetween over said longitudinal slot;

a plurality of engaging members each for individually engaging at least one sliver can;

positioning means for selectively positioning said engaging members, said positioning means including an angular movement means, said angular movement means including an elongated rod member having a longitudinal axis, a plurality of slide blocks, slide block guide means and means for rotating said rod member about its axis, each slide block being secured to said rod member at a fixed axial position relative thereto for axial movement therewith and permitting rotation of said rod member relative thereto, said slide block guide means for guiding said slide blocks during axial movement of said rod member and said slide blocks, said engaging members being secured to said rod member at generally uniform spacings therealong and extending generally radially from said rod member relative to said rod member axis, and said means for rotating said rod member about its axis being operable to rotate said rod member to effect movement of said engaging members between engage positions in which said engaging members project upwardly through said longitudinal slot beyond said plane in position for engagement with sliver cans to effect advancing movement thereof and disengage positions angularly displaced from said engage positions relative to said rod member axis in which said engaging members are disposed below said plane; and drive means, operatively connected to said positioning means, for axially displacing said rod member in a drive direction to an advance forward position with said engaging members in said engage positions to effect advancing movement of the sliver cans and for axially displacing said rod member in a return direction with said engaging members in said disengage positions out of sliver can engagement to a ready position at which said engaging members can be subsequently moved by said means for rotating said rod member from said disengage positions to said engage positions for engagement and advancement of respective following sliver cans upon subsequent axial movement of said rod member in said drive direction, said means for rotating said rod member being operatively connected to said drive means for rotating said rod member to effect movement of said engaging members into said engage positions in correspondence with displacement of said rod member into said ready position and for rotation of said rod member by said means for rotating said rod member to effect movement of said engaging members from said engage positions to said disengage positions in correspondence with displacement of said rod member into said advance forward position.

2. Apparatus for transporting sliver cans according to claim 1 wherein each sliver can includes a circumferential rim portion of a predetermined thickness as measured in a radial direction thereof and characterized further in that said sliver can supporting means supports the sliver cans thereon with each adjacent pair of sliver cans at a uniform center to center spacing from one another and said drive means includes means for cyclically axially displacing said rod member in said drive and return directions by an amount of travel no less than said uniform engaging member spacing.

3. Apparatus for transporting sliver cans according to claim 2 and characterized further in that the uniform center to center spacing between each adjacent pair of sliver cans is a multiple of said uniform engaging member spacing.

4. Apparatus for transporting sliver cans according to claim 1 and characterized further in that said drive means includes a rotatable disk member and a drive rod pivotally connected at one end to said rotatable disk and at its other end to one end of said rod member, said disk member being rotatable to cyclically axially displace said rod member.

5. Apparatus for transporting sliver cans between a sliver can handling location and a textile spinning machine at which a plurality of spinning stations are each adapted for receiving a supply of sliver delivered from a respective sliver can, comprising:

sliver can supporting means for supporting sliver cans during movement of the sliver cans along at least a portion of a transport path extending between the sliver can handling location and the textile spinning machine, said sliver can support means including a pair of generally planar support surfaces on which the sliver cans are supported for movement in a plane, said planar support surfaces being spaced from one another in a direction transverse to the transport path, and a longitudinal slot extending between said planar support surfaces parallel to the transport path, said sliver can support means supporting each sliver can thereon in a supported disposition in which the sliver can is supported by both of said planar support surfaces and extends therebetween over said longitudinal slot;

a plurality of engaging members each for individually engaging at least one sliver can;

positioning means for selectively positioning said engaging members, said positioning means including an angular movement means, said angular movement means including an elongated rod member having a longitudinal axis, a plurality of slide blocks, slide block guide means and means for rotating said rod member about its axis, said slide block guide means for guiding said slide blocks during axial movement of said rod member and said slide blocks, said engaging members being secured to said rod member at generally uniform spacings therealong and extending generally radially from said rod member relative to said rod member axis, said means for rotating said rod member about its axis being operable to rotate said rod member to effect movement of said engaging members between engage positions in which said engaging members project upwardly through said longitudinal slot beyond said plane in position for engagement with sliver cans to effect advancing movement thereof and disengage positions angularly displaced from said engage positions relative to said rod member axis in which said engaging members are disposed below said plane and each slide block being secured to said rod member generally at the axial location thereon of a respective one of said engaging members and including a slot extending radially with respect to said rod member axis for receiving the respective associated engaging member therein, each said slot permitting movement of the respective associated engaging member between its engage and disengage positions; and drive means, operatively connected to said positioning means, for axially displacing said rod member in a drive direction to an advance forward position with said engaging members in said engage positions to effect advancing movement of the sliver cans and for axially displacing said rod member in a return direction with said engaging members in said disengage positions out of sliver can engagement to a ready position at which said engaging members can be subsequently moved by said means for rotating said rod member from said disengage positions to said engage positions for engagement and advancement of respective following sliver cans upon subsequent axial movement of said rod member in said drive direction, said means for rotating said rod member being operatively connected to said drive means for rotating said rod member to effect movement of said engaging members into said engage positions in correspondence with displacement of said rod member into said ready position and for rotation of said rod member by said means for rotating said rod member to effect movement of said engaging members from said engage positions to said disengage positions in correspondence with displacement of said rod member into said advance forward position.

6. Apparatus for transporting sliver cans between a sliver can handling location and a textile spinning machine at which a plurality of spinning stations are each adapted for receiving a supply of sliver delivered from a respective sliver can, comprising:

sliver can supporting means for supporting sliver cans during movement of the sliver cans along at least a portion of a transport path extending between the sliver can handling location and the textile spinning machine, said sliver can support means including a pair of generally planar support surfaces on which the sliver cans are supported for movement in a plane, said planar support surfaces being spaced from one another in a direction transverse to the transport path, and a longitudinal slot extending between said planar support surfaces parallel to the transport path, said sliver can support means supporting each sliver can thereon in a supported disposition in which the sliver can is supported by both of said planar support surfaces and extends therebetween over said longitudinal slot;

a plurality of engaging members each for individually engaging at least one sliver can;

positioning means for selectively positioning said engaging members, said positioning means including an angular movement means, said angular movement means including an elongated rod member having a longitudinal axis, a plurality of slide blocks, slide block guide means and means for rotating said rod member about its axis, each slide block being secured to said rod member at a fixed axial position relative thereto for axial movement therewith and permitting rotation of said rod member relative thereto, said slide block guide means for guiding said slide blocks during axial movement of said rod member and said slide blocks, said engaging members being secured to said rod member at generally uniform spacings therealong and extending generally radially from said rod member relative to said rod member axis, and said means for rotating said rod member about its axis being operable to rotate said rod member to effect movement of said engaging members between engage positions in which said engaging members project upwardly through said longitudinal slot beyond said plane in position for engagement with sliver cans to effect advancing movement thereof and disengage positions angularly displaced from said engage positions relative to said rod member axis in which said engaging members are disposed below said plane and each slide block being secured to said rod member generally at the axial location thereon of a respective one of said engaging members and including a top surface having an inclined portion and a slot formed in its top surface extending radially with respect to said rod member for receiving the respective associated engaging member therein and permitting movement of the respective associated engaging member between its engage and disengage positions, the angle between each engaging member in its engage position and said inclined top surface portion of the associated slide block being greater than ninety degrees; and drive means, operatively connected to said positioning means, for axially displacing said rod member in a drive direction to an advance forward position with said engaging members in said engage positions to effect advancing movement of the sliver cans and for axially displacing said rod member in a return direction with said engaging members in said disengage positions out of sliver can engagement to a ready position at which said engaging members can be subsequently moved by said means for rotating said rod member from said disengage positions to said engage positions for engagement and advancement of respective following sliver cans upon subsequent axial movement of said rod member in said drive direction, said means for rotating said rod member being operatively connected to said drive means for rotating said rod member to effect movement of said engaging members into said engage positions in correspondence with displacement of said rod member into said ready position and for rotation of said rod member by said means for rotating said rod member to effect movement of said engaging members from said engage positions to said disengage positions in correspondence with displacement of said rod member into said advance forward position.

* * * * *